United States Patent [19]

Kojima et al.

[11] Patent Number: 4,889,667
[45] Date of Patent: Dec. 26, 1989

[54] METHOD FOR SUPERVISION OF INJECTION MOLDING BY USE OF WAVEFORM OF INTERNAL DIE PRESSURE

[75] Inventors: Hisashi Kojima; Tatsuo Miyagi, both of Tokyo, Japan

[73] Assignee: Technoplas Inc., Tokyo, Japan

[21] Appl. No.: 53,567

[22] Filed: May 21, 1987

Related U.S. Application Data

[63] Continuation of Ser. No. 616,687, Jun. 4, 1984, abandoned.

[30] Foreign Application Priority Data

Jun. 3, 1983 [JP] Japan ................................ 58-99243

[51] Int. Cl.[4] .............................................. B29C 45/77
[52] U.S. Cl. .................... 264/40.1; 264/40.5; 425/149; 425/170
[58] Field of Search .................... 264/40.5, 40.1, 40.7; 425/145, 149, 169, 170

[56] References Cited

U.S. PATENT DOCUMENTS

| | | | |
|---|---|---|---|
| 3,840,312 | 10/1974 | Paulson et al. | 425/149 |
| 4,060,362 | 11/1977 | Wilson, III | 425/149 |
| 4,359,435 | 11/1982 | Kogure | 264/40.5 |

FOREIGN PATENT DOCUMENTS

| | | | |
|---|---|---|---|
| 2615445 | 10/1977 | Fed. Rep. of Germany | 425/149 |
| 0212041 | 12/1982 | Japan | |
| 58-52486 | 11/1983 | Japan | |

OTHER PUBLICATIONS

Siemens Energietechnik 4, Sep./Oct. 1982, pp. 226-229.
Siemens Components 19, Mar. 1981, pp. 46-49.

Primary Examiner—Jan H. Silbaugh
Assistant Examiner—Jill L. Heitbrink
Attorney, Agent, or Firm—Wenderoth, Lind & Ponack

[57] ABSTRACT

A method for the supervision of injection molding including monitoring an internal die pressure of molten resin flowing through a resin passageway in a mold to form a monitored waveform; displaying the monitored waveform together with a predetermined reference waveform on a display unit such as a CRT, and comparing the monitored waveform with an allowable value of the reference waveform to determine any abnormality caused in a molding process. The injection molding can be supervised with accuracy on the basis of the reference waveform representing the optimum internal die pressure, thereby increasing the quality of molded articles.

1 Claim, 4 Drawing Sheets

METHOD FOR SUPERVISION OF INJECTION MOLDING BY USE OF WAVEFORM OF INTERNAL DIE PRESSURE

This application is a continuation of now abandoned application Ser. No. 616,687, filed June 4, 1984, now abandoned.

BACKGROUND OF THE INVENTION

1. Field of the Invention

This invention relates to a method for the supervision of the quality of molded articles produced by injection molding and particularly to a method for the supervision of injection molding from the outset of the filling of molten resin into a mold to the completion of the molding on the basis of waveform of the inner die pressure in a resin passageway in the mold.

2. Description of the Prior Art

As one conventional supervising method of this type, there has been proposed an apparatus for the correction of molding data obtained during injection molding disclosed in Japanese Patent Application Public Disclosure Sho. 57(1982)-212041. Although the prior art apparatus can observe an occurrence of abnormality every shot of injection molding and a variation in the condition of the respective shots of injection molding, it nevertheless cannot find out what process is abnormal at one shot of injection molding and what may be the cause. With the prior art apparatus, the cause of abnormality in molding can therefore be investigated as a result of compiling statistics of the entire molding condition of several molding shots carried out for fixed times.

Further, the prior art apparatus, as claimed in the disclosure, utilizes the resin pressure in a mold cavity as one of variables in the molding process. However, the idea of determining reference, allowable and critical values of the resin pressure at one molding shot is not disclosed at all. Besides, the term "resin pressure" used therein is generally termed as "peak pressure", but does not signify internal die pressure described later.

Furthermore, there has been proposed in the disclosure a method of displaying on a cathode-ray tube device the deviation value of variables obtained over the entire molding lots. However, the injection molding as a continuing process from the outset of the filling of molten resin to the completion of the molding cannot be indicated for every shot of injection molding.

Still more, the aforementioned apparatus does not serve a function of comparing each molding shot with the optimum reference shot which is experimentally determined in advance.

Now, in keeping with the development of engineering plastics of today, injection molding is naturally required to be accomplished with reproduction on the order of microns and to promptly resume the optimum molding condition thereof when an accident occurs.

In order to meet the former requirement, it is necessary to judge abnormality at each shot of injection molding and further find out what process is abnormal in the injection molding. This is because the quality of molded articles depends practically on various factors over several molding processes from the outset of the filling process for injecting molten resin into the mold to the termination of the dwelling process, and therefore, supervision of examining a molded article to see whether it is good or not cannot promptly be accomplished with accuracy unless the process in which the abnormality is caused is found out. Accordingly, the standpoint of supervision is the primary requisite to examine the quality of the molded articles.

One of the present inventors of this invention previously accomplished a method of enabling resin pressure in a mold to be sized as a continuous waveform of internal die pressure of molten resin filled in the mold, which is obtained on the basis of functions of properties of plastics as disclosed in Japanese Patent Application Public Disclosure Sho. No. 52(1977)-14658. The inner die pressure represents the conditions of the molten resin from the outset of the filling process to the termination of the dwelling process and is detected by means of a sensor disposed in a resin passageway for introducing molten into the mold. In this sense, the internal die pressure in the resin passageway should be distinguished from the resin pressure considered as a peak pressure which is detected by means of a sensor disposed in a cavity of the mold as disclosed in Japanese Utility Mode Publication Sho. No. 39(1964)-18976 and it is expressed as pressure waveform in the form of an analogue. That is to say, the waveform of the internal die pressure shows the variation in condition of one molding shot, under which a molded article is produced and is referred to as the result of each molding condition. Accordingly, the supervision of the quality of molded articles can be carried out by use of the aforementioned waveform of the internal die pressure.

In order to comply with the latter of the requirements so far described, it is desired to compare each shot of injection molding with the reference shot under observation, thereby promptly detecting what process differs from that under the optimum condition. Consequently, the cause of the deviation in the molding process can be estimated from the abnormal portion thus recognized.

SUMMARY OF THE INVENTION

An object of this invention is to provide a method for the supervision of an injection molding process, which is capable of finding out the process causing abnormality at each shot of injection molding and promptly coping with the abnormality, thereby to resume its optimum molding condition and enjoy a high degree of reproducibility.

To accomplish the object described above according to the present invention, there is provided a method for the supervision of injection molding by use of the waveform of internal die pressure, which comprises displaying a reference waveform of the internal die pressure together with monitored waveform of actual internal die pressure detected in a mold at each shot of the injection molding and comparing the detected value of the monitored waveform with the allowable value of the reference waveform.

The reference waveform of internal die pressure is previously determined by continuously monitoring the internal die pressure in a resin passageway for introducing molten plastic material into a mold and choosing the waveform of the internal die pressure under which molded articles of good quality are produced.

The waveform obtained by monitoring the internal die pressure at each shot of the injection molding is compared with the predetermined reference waveform described above to find whether the detected value based on the monitored internal die pressure exceeds the allowable value based on the reference waveform, and when the detected value exceeds the allowable value, the molding process causing an abnormality is revealed by use of a suitable means for issuing a warning. The data thus detected is arbitrarily outputted for a record through the medium of a CRT or the like. Futhermore, the data is, otherwise, fed back to a driving system for the molding machine, consequently to enable the stable production of molded articles of good quality to be maintained for a long time.

The other objects and characteristic features of the present invention will become apparent from detailed description to be given hereinafter with reference to the accompanying drawings.

DESCRIPTION OF THE PREFERRED EMBODIMENTS

Figure 1:
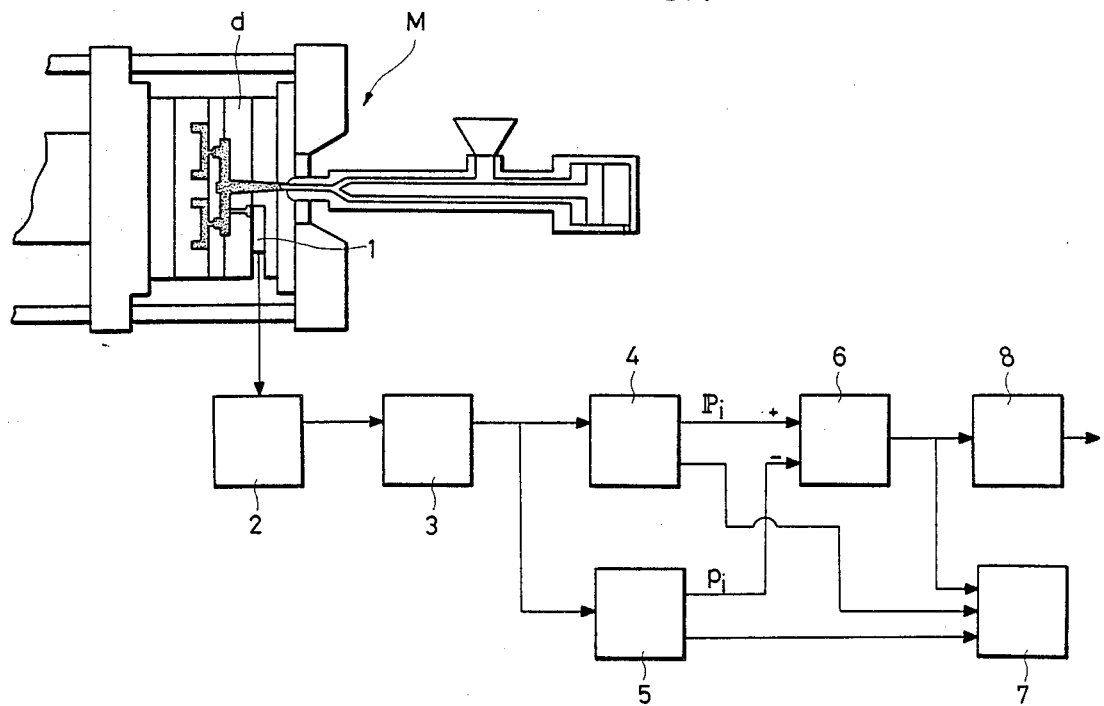
FIG. 1 is a block circuit diagram illustrating one preferred embodiment of the method for the supervision by use of the waveform of internal die pressure according to this invention.

In the drawings, numeral 1 denotes a pressure sensor disposed in a resin passageway for introducing molten resin inside a mold d, and numeral 2 denotes a pressure detector for determining the resin pressure (internal die pressure) exerted on the pressure sensor 1 based on a signal output therefrom. The molten resin is injected into the mold d through the nozzle of an injection molding machine M, and when the leading surface of the molten resin flowing into the mold reaches the resin passageway portion in the mold, the pressure of the molten resin is detected as internal die pressure by the pressure sensor 1. Accordingly, the internal die pressure of the molten resin in the passageway is expressed as a continuous waveform by the pressure varying with time from the filling process of the molten resin to the completion of the molding. Numeral 3 denotes a converter for converting the pressure signal outputted from the pressure detector 2 to an electrical signal, and numeral 4 denotes a reference waveform setting unit for storing the reference waveform of internal die pressure under which molded articles of good quality are produced. The reference waveform is predetermined on the basis of the electrical signals fed from the converter 3. Numeral 5 denotes a monitored pressure input unit to which the actual internal die pressure monitored using the detector 2 at each shot of the injection molding is inputted as a waveform signal. Numeral 6 denotes a comparative processor for comparing the predetermined reference waveform set in the reference waveform setting unit 4 with the monitored waveform inputted to the input unit 5, and numeral 7 denotes a display unit for displaying the monitored waveform fed from the input unit 5 together with the reference waveform outputted from the reference waveform setting unit 4 and for arbitrarily displaying the result of comparing the monitored and reference waveforms by a comparative operation in the processor 6. The display unit 7 may be composed of a cathode-ray tube (CRT), for example. On this display unit 7 are displayed the results of the comparing operation which is outputted from the comparative processor 6. Denoted by 8 is an output unit for delivering as output signals the results of the comparing operation from the processor 6.

To be specific, experimental injection moldings are previously carried out several times considering the molding condition inclusive of the kind of the resin to be handled, the shape of the mold to be used and a desired accuracy of molded article to be produced, thereby an internal die pressure under which molded articles of good quality can be produced. The reference internal die pressure thus determined is stored as an optimum reference waveform of internal die pressure in the reference waveform setting unit 4. The aforementioned reference waveform is subjected to sampling at intervals of a fixed time to produce corresponding digital signals. Namely, the reference waveform is divided into n-signals as the time proceeds. For example, the sampled signal representing pressure value $P_i$ is stored at the time $n_i$ as a reference values, and that of the subsequent pressure value $P_{i+1}$ is also stored at the time $n_{i+1}$ as the subsequent reference value. Likewise, the sampled signals are stored in order as the reference pressure values in the reference waveform setting unit 4. The allowable value E at each sampling time is set in a memory 11 of the comparative processor 6. The allowable values E are determined by taking the molding condition for judging the abnormality of the molded article into consideration and displayed on the CRT as a continuous waveform which is irregular in width and contains the aforementioned reference waveform, as defined by the chain lines in FIG. 5.

Figure 2:
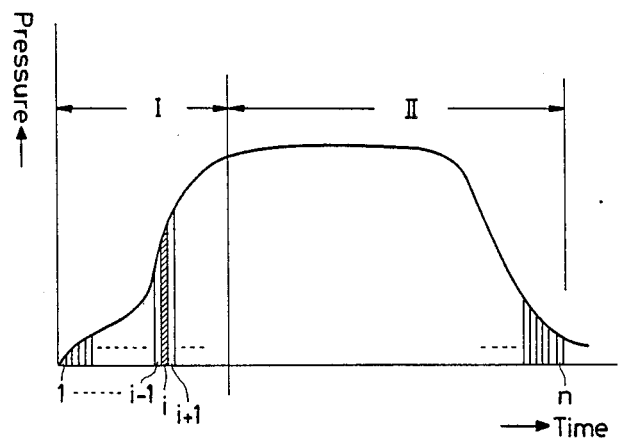
FIG. 2 is an explanatory diagram illustrating the waveform representing time-varying internal die pressure.

To be more specific, the aforementioned reference waveform can be selectively varied by each process in one injection molding from the point of view of the requirement for the accuracy of the desired products. That is to say, as illustrated in FIG. 2, the waveform at one molding shot can be considered as two parts, one being a filling process. I in which the internal die pressure is rapidly varied and the other being a dwelling process in which the internal die pressure is gradually varied, so that they can individually be observed.

Further, in the reference waveform setting unit 4, a criterional value for judgement of the abnormality in the injection molding is also stored.

The aforementioned input unit 5 receives the monitored values $p_i$ which are serially obtained by subjecting the internal die pressure detected at each shot to a sampling operation in the same way as the reference waveform is stored in the reference waveform setting unit.

Figure 3:
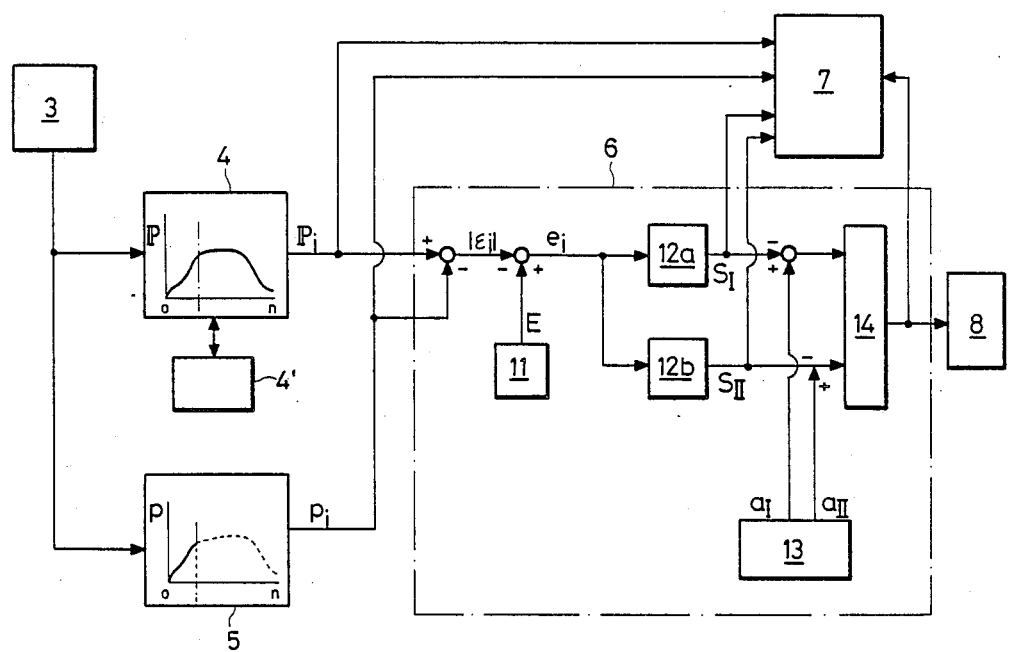
FIG. 3 is an explanatory block diagram illustrating a fundamental function of this invention.
Figure 4:
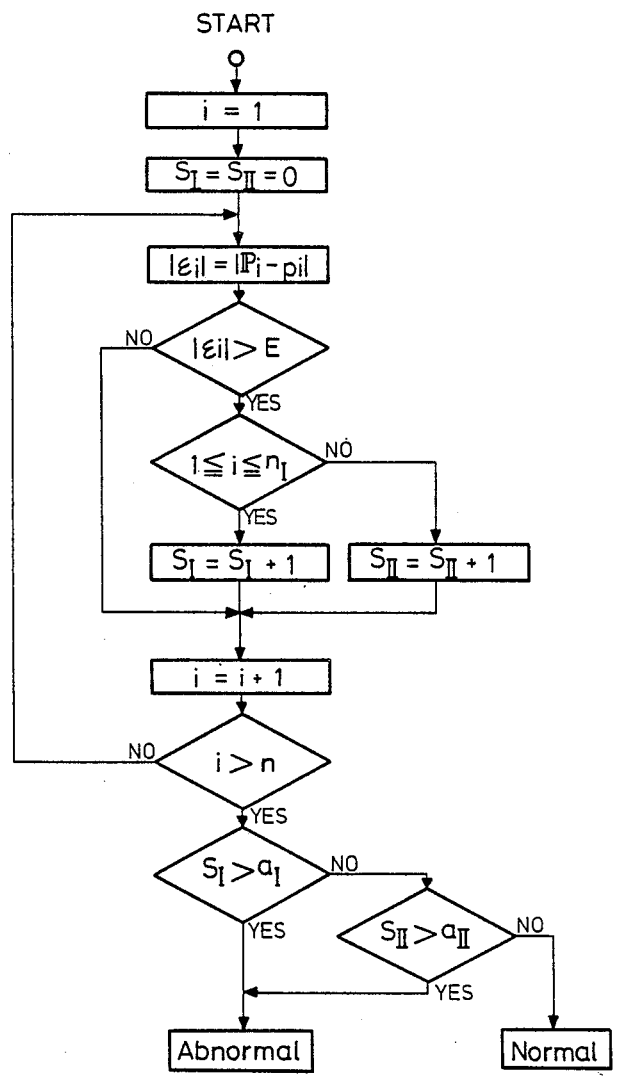
FIG. 4 is a flow chart illustrating the procedure of the processing according to the method of this invention for the supervision of injection molding.

Now, the supervision by use of the aforementioned device will be described hereinafter also referring to FIG. 3.

At the beginning, the reference waveform is inputted to the reference waveform setting unit 4. If the reference waveform is predetermined, it may be inputted from an external memory 4' to the unit 4. Simultaneously, the reference waveform is displayed on the display unit 7.

When the molding shot starts while being monitored in the manner described above, the internal die pressure varying with time is successively detected and inputted as a monitored waveform to the input unit 5. At the same time, the monitored waveform is displayed on the display unit 7. Simultaneously, the reference value $P_i$ and the detected value $p_i$ are fed to the comparative processor 6. Assume that the time required for one molding shot is divided by n to make signal train defined by the time i. First, the value of the time i−1 clears away from the comparative processor 6 ($S_I=S_{II}=0$), and then the reference value $P_i$ fed from the reference waveform setting unit 4 and the detected value $p_i$ fed from the input unit 6 are fed to the comparative processor 5, thereby obtaining deviation value ($|i| = |P_i - p_i|$). The deviation value $|\epsilon i|$, thus obtained is compared with the allowable value E so as to examine deviation value $|\epsilon i|$ to find whether it is larger than the allowable value E ($|\epsilon i| > E$). When the deviation value $|\epsilon i|$ is smaller than the value E, the molding shot under observation is regarded as being normal. When the value $|\epsilon i|$ is larger, the detected waveform is subjected to a discriminating operation in discriminators 12a and 12b thereby to find which process of filling or dwelling causes abnormality. For each sampling period in which the deviation value exceeds the allowable value, the value of $S_I$ or $S_{II}$ is increased by one. That is, $S_I$ is increased by one each time the deviation value exceeds the allowable value during the filling process, and $S_{II}$ is increased by one each time the deviation value exceeds the allowable value during the dwelling process. When the molding shot is completed, it is evaluated by comparing $S_I$ and $S_{II}$ with criterional values $a_I$ and $a_{II}$ which have been previously set in the criterion setting unit 13 for the respective processes. When an abnormality is recognized in either process, an OR gate circuit 14 delivers a command signal to the output unit 8.

Figure 5:
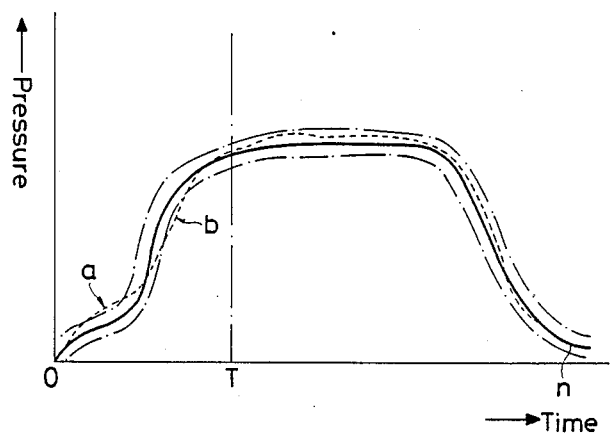
FIG. 5 is a schematic diagram showing the monitored waveform superposed on the reference waveform.

The monitored waveform of one molding shot which is obtained by the procedure described above is superposed upon the reference waveform on the screen of the display unit 7, thereby enabling the abnormal process to be recognized promptly. As illustrated in FIG. 5 as one example, comparison of the monitored waveform (dotted line) and the reference waveform (solid line) indicates that abnormalities exist at points a and b at which the monitored waveform has deviated from the allowable range (defined by chain lines). In this diagram, T represents a turnover point between the processes I and II.

In case of normal molding condition, the injection molding is continuously carried out. However, when abnormality occurs, it is dealt with in accordance with various command signals produced out of the output unit 8. To be more concrete, in this case an alarm or warning may be issued while the abnormal point (points a and b, for example) is indicated by a cursor, indicator on the screen of the display unit. Thus, an operator can confirm the existence of the abnormality in the molding on the display unit with his eye. As occasion demands, a cumulative value of the abnormalities caused in the molding shots repeatedly carried out is displayed in a digital form, so that degree of the abnormality can be confirmed numerically. Otherwise, the output signal as a feed-back signal may be forwarded to an automatic correction device.

According to the embodiment described above, since the criterional values for judging an abnormality in the injection molding are selectively set for the respective processes I and II, weight value can be included in the judging factors for abnormality in the injection molding under observation in conformity to the degree of importance in the molding processes. Specifically, by dividing the molding process into a filling process and a dwelling process, supervision desirable for the optimum molding condition can be accomplished with accuracy.

Figure 6:
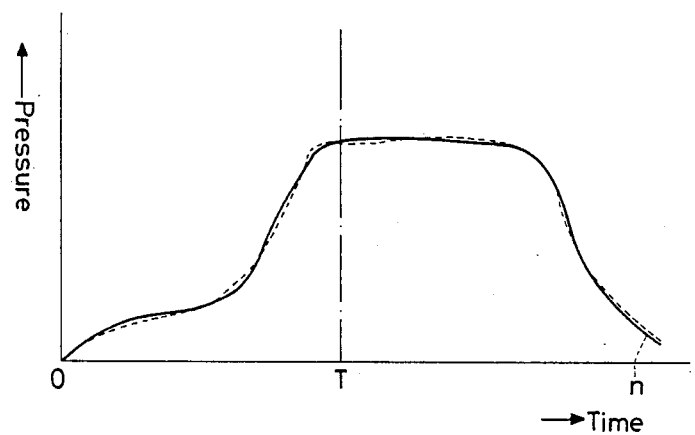

Another embodiment according to this invention will be described hereinafter with reference to FIG. 6, in which the turnover point T between the filling process I and the dwelling process II can freely be shifted on the molding waveform.

The period of the filling process (0-T) is instantaneous in comparison with that of the dwelling process (T-n). Accordingly, the turnover point T is shifted to extend the period of the filling process as illustrated, with the result that the sampling number in the filling process (0-T) is made larger than that in the dwelling process per unit time. Consequently, even a little change which is brought about in the filling process can precisely be observed on the waveform displayed on the screen of the display unit 7.

Although the method for the supervision in which one molding shot is composed of a filling process I and a dwelling process II is so far described, the molding shot is not restricted to be divided into only two processes. The two processes may be subdivided into four processes, for example, so that the processes can be provided with the respective weight values according to the required accuracy of a molded article. Likewise, it is not indispensable for this invention to divide one molding shot under observation into the aforementioned two processes. Namely, the entire molding process may be observed collectively in the case where a high accuracy is not required for a molded article to be produced.

Otherwise, either of the processes I and II may selectively be observed as occasion demands.

As is clear from the description given above, the method for the supervision in injection molding according to this invention permits the quality of molded articles to be supervised with accuracy on the basis of the reference waveform representing the optimum internal die pressure and enjoys high degree of reproducibility. Further, suitable conditions for dealing with an abnormality caused at each shot of injection molding can promptly be determined in a short time in accordance with the predetermined waveform of the optimum internal die pressure. Besides, an operator can correctly find out what process is abnormal by observing the monitored waveform of the detected internal die pressure in comparison with the predetermined reference waveform displayed on the display unit, thereby enabling each process of the molding injection to be manually handled.

What is claimed is:

1. A method for the supervision of injection molding in which an actual internal passageway pressure of molten resin is continuously detected during a process period, said molten resin being injected into a mold through a resin passageway, said method comprising the steps of:
   determining an optimum internal passageway pressure, said optimum internal passageway pressure representing a pressure which is expected to be detected during said process period;
   dividing said process period into N sampling periods, wherein N is a positive integer;
   determining, at each sampling period, a deviation value between the actual internal passageway pressure and the optimum internal passageway pressure;
   further dividing said process period into at least two subprocess periods, wherein the number of subprocess periods is substantially smaller than N;

determining, for each subprocess period, a number of sampling periods in which said deviation value exceeds a predetermined allowable value;

comparing, for each subprocess period, a criterional value with said number of sampling periods in which said deviation value exceeds said predetermined allowable value, said criterional value being independently set in advance for each subprocess period and representing a maximum number of permissible sampling periods in which said deviation value may exceed said predetermined allowable value for each subprocess period; and providing an alarm indication when the criterional value of any subprocess period is less than the number of sampling periods in which said deviation value exceeds said predetermined allowable value for the subprocess corresponding to the criterional value.

* * * * *